(12) United States Patent
DeMartino

(10) Patent No.: US 8,732,782 B1
(45) Date of Patent: May 20, 2014

(54) SYSTEMS AND METHODS FOR PROVIDING COMMUNICATION SERVICES OVER TELEPHONE LINES

(75) Inventor: Kevin A. DeMartino, Bedford, MA (US)

(73) Assignee: Verizon Services Corp., Ashburn, VA (US)

( * ) Notice: Subject to any disclaimer, the term of this patent is extended or adjusted under 35 U.S.C. 154(b) by 2564 days.

(21) Appl. No.: 10/961,705

(22) Filed: Oct. 7, 2004

Related U.S. Application Data

(60) Provisional application No. 60/510,672, filed on Oct. 10, 2003.

(51) Int. Cl.
*H04N 7/173* (2011.01)

(52) U.S. Cl.
USPC ............................ 725/119; 725/120; 725/129

(58) Field of Classification Search
USPC .......................................... 725/119, 120, 129
See application file for complete search history.

(56) References Cited

U.S. PATENT DOCUMENTS

| | | | |
|---|---|---|---|
| 5,303,229 A * | 4/1994 | Withers et al. ................. | 370/490 |
| 5,371,532 A * | 12/1994 | Gelman et al. .................. | 725/88 |
| 5,768,279 A * | 6/1998 | Barn et al. ...................... | 370/486 |
| 6,473,427 B1 * | 10/2002 | Brodigan .................... | 370/395.1 |
| 6,519,255 B1 * | 2/2003 | Graves ........................... | 370/392 |
| 6,530,086 B1 * | 3/2003 | Brodigan ........................ | 725/95 |
| 6,538,781 B1 * | 3/2003 | Beierle et al. ................... | 398/79 |
| 6,714,545 B1 * | 3/2004 | Hugenberg et al. ........ | 370/395.1 |
| 6,775,271 B1 | 8/2004 | Johnson et al. | |
| 6,987,769 B1 | 1/2006 | Dougherty et al. | |
| 7,042,837 B1 | 5/2006 | Cassiday et al. | |
| 7,085,495 B2 * | 8/2006 | Birk et al. ....................... | 398/71 |
| 7,099,349 B1 | 8/2006 | Phillips et al. | |
| 7,103,907 B1 * | 9/2006 | Buabbud ....................... | 725/129 |
| 7,152,237 B2 * | 12/2006 | Flickinger et al. .............. | 725/42 |
| 7,260,823 B2 * | 8/2007 | Schlack et al. ................... | 725/9 |
| 7,266,122 B1 | 9/2007 | Hogg et al. | |
| 7,330,888 B2 | 2/2008 | Storry et al. | |
| 7,346,071 B2 | 3/2008 | Bareis | |
| 7,362,709 B1 | 4/2008 | Hui et al. | |
| 7,768,938 B2 | 8/2010 | DeMartino | |
| 2002/0010779 A1 * | 1/2002 | Heller et al. .................. | 709/226 |
| 2002/0071149 A1 | 6/2002 | Xu et al. | |
| 2003/0200551 A1 * | 10/2003 | Kang ............................. | 725/120 |
| 2003/0226149 A1 * | 12/2003 | Chun et al. ..................... | 725/78 |
| 2004/0031053 A1 * | 2/2004 | Lim et al. ........................ | 725/86 |

OTHER PUBLICATIONS

"Telephone Lines and ADSL", Extracted from Residential Broadband—An Insider's Guide to the Battle for the Last Mile, by Kim Maxwell. John Wiley & Sons, Inc., copyright 1999. pp. 215-241.

(Continued)

*Primary Examiner* — Nicholas Corbo

(57) ABSTRACT

A system and method is described for providing communication services, including voice communications, data communications, audio/video-on-demand, and broadcast audio/video, over twisted-pair telephone lines. The system and method are based on broadband transmission techniques, such as fiber-to-the-neighborhood (FTTN) and digital subscriber line (DSL) techniques. This approach can be applied to develop an access network comprising an array of remote terminals connected to one or more telephone central offices by fiber optic cables and connected to subscriber nodes by twisted-pair lines. Each remote terminal has the capacity to support multiple subscribers and to switch broadcast channels onto subscriber lines. Each subscriber is provided the capability to individually select via the DSL interface one or more a broadcast channels from a larger set of channels.

30 Claims, 8 Drawing Sheets

(56) References Cited

OTHER PUBLICATIONS

Internatioanl Engineering Consortium; EC: Very-High-Data-Rate Digital Subcriber Line (VDSL); http://www.iec.org/online/tutorials/vdsl/topic05.html?Next.x=36&Next.y=17; Sep. 23, 2003; 4 Pages.

VDSL Tutorial, "Fiber-Copper Access to the Information Highway"; DSL Tutorial; www.dslforum.org/aboutdsl/vdsl_tutorial.html; Sep. 23, 2003, 6 Pages.

"Asymmetric Digital Subcriber Line: Interim Technology for the Next Forty Years"; IEEE Communications Magazine; Oct. 1996; pp. 100-106.

"Systems Considerations for the Use of xDSL Technology for Data Access", by George T. Hawley, Diamond Lane Communications Corporation; IEEE Communications Magazine, Mar. 1997. pp. 56-60.

"Very-High-Speed Digital Subcriber Lines", by John M. Cioffi, Stanford University; IEEE Communications Magazine, Apr. 1999. pp. 72-79.

"Emerging High-Speed xDSL Access Services: Architectures, Issues, Insights, and Implications", by Vijay K. Bhagavath, Elastic Networks; IEEE Communications Magazine, Nov. 1999, pp. 106-114.

"Introduction to SDH/SONET", Guest Editorial; IEEE Communications Magazine, Sep. 1993; pp. 30-33.

"MPEG-1 and MPEG-2 Digital Video Coding Standards"; http://wwwam.hhi.de/mpeg-video/papers/sikora/mpeg1_2/mpeg1_2/mpeg1_2.htm, Oct. 3, 1997; 22 Pages.

"Hierarchical Coding of Digital Television", by Tihao Chiang and Dimitris Anastassiou; IEEE Communications Magazine, May 1994; pp. 38-45.

"MPEG Coding for Variable Bit Rate Video Transmission", by Pramod Pancha and Magda El Zarki; IEEE Communications Magazine, May 1994; pp. 54-66.

"The DTM Gigabit Network", by Christer Bohm et al, Journal of High Speed Networks 3 (1994), IOS Press; pp. 109-126.

"U.S. Phone Companies Set Stage for Fiber to the Curb", News Analysis; IEEE Spectrum, Sep. 2003; 2 Pages.

"Historical Perspectives on the U.S. Telephone Loop", by George T. Hawley; IEEE Communications Magazine, Mar. 1991; pp. 24-28.

"Evolution of Fiber in the Residential Loop Plant", by Paul W. Shumate and Richard K. Snelling; IEEE Communications Magazine, Mar. 1991; pp. 68-73.

"VDSL Chip Set Lowers Power Dissipation", by eeProduct Center, Nov. 15, 1999; http://www.eetimes.com/article/showArticle.jhtml?articleId=15301386; 1 Page.

"New Urgency in VDSL Development", by Fred Dawson, XChange, Chicago Aug. 30-Sep. 1, 2004; 1 Page.

"Behind the VDSL Renaissance", by Vince Vittore, Telephony Online, A Primedia Publication, Sep. 15, 2003. 3 Pages.

\* cited by examiner

Achievable ADSL Data Rate VS Length of Twisted Pair Access Line

| Length of TP Access Line | ADSL Downstream Data Rate |
|---|---|
| 9000 ft | 9 Mb/s |
| 12000 ft | 6 Mb/s |
| 16000 ft | 2 Mb/s |
| 18000 ft | 1.5 Mb/s |

*FIG. 2*
*(PRIOR ART)*

Achievable VDSL Data Rate VS Length of Twisted Pair Access Line

| Length of TP Access Line | VDSL Downstream Data Rate |
|---|---|
| 1000 ft | 52 Mb/s |
| 3000 ft | 26 Mb/s |
| 4500 ft | 13 Mb/s |

*FIG. 3*
*(PRIOR ART)*

Network Service Options

| Service Option | Broadcast Capability | ADSL Capability |
|---|---|---|
| Option 1 | 24.5 Mb/s<br>1 HDTV & NTSC channels | 1.5 Mb/s<br>1 MPEG-1 VOD channel |
| Option 2 | 20 Mb/s<br>1 HDTV channel | 6 Mb/s<br>2 MPEG-2 VOD channels |
| Option 3 | 13 Mb/s<br>3 NTSC channels | 13 Mb/s<br>3 MPEG VOD channels |

*FIG. 9*

SYSTEMS AND METHODS FOR PROVIDING COMMUNICATION SERVICES OVER TELEPHONE LINES

CROSS-REFERENCE TO RELATED APPLICATIONS

This application claims the benefit of U.S. Provisional Application No. 60/510,672 filed on Oct. 10, 2003, the entire contents of which are herein incorporated by reference.

FIELD OF THE INVENTION

This invention relates to systems and methods in the field of communication networks. More specifically, it relates to systems and methods for providing a complete set of communication services over telephone lines using digital subscriber line (DSL) techniques.

BACKGROUND

I. Introduction

Communication services are often defined as: voice and telephony; video, which includes video-on-demand and broadcast video and associated audio; and data communications, such as computer communications. Telephone networks have been traditionally designed to support voice communications. Recent developments in technology have provided the ability to support high speed data communications over traditional telephone networks. However, telephone networks are at a significant disadvantage compared to coaxial cable (cable TV) networks. Cable connections to subscribers can support much higher bandwidths than twisted pair telephone lines. With the advent of digital subscriber line (DSL) technology, the data rates that can be support by twisted pair lines can be significantly increased. However, these rates currently fall far short of the rates that can be supported by coaxial cable systems.

To be able to compete with the cable companies, the telephone companies need to further expanded the capacity of the access lines and to support an audio/video broadcast capability comparable to capability provided by the cable systems. Fiber-to-the-home (FTTH) (or fiber-to-the-premise) is the ultimate solution. However, FTTH is very expensive and will take many years to fully deploy. The telephone companies need a solution that is less expensive than FTTH and that can be deployed more quickly.

II. Telephone Networks

A telephone network includes a plurality of access networks that connect subscriber nodes to central offices (COs) and an interoffice network that interconnects the COs as illustrated in FIG. 1. A subscriber node is located on an opposite end of the access line from the CO. The illustration in FIG. 1 defines a smaller conventional telephone network with a few COs and a small number of subscriber access lines per CO. A larger telephone network includes thousands of COs and many more access lines per CO.

In the conventional interoffice network, the COs are interconnected by fiber optic cables having multiple fibers. Each fiber supports multiple Synchronous Optical Network (SONET) channels that are time division multiplexed. In some cases, a fiber also supports multiple wavelength division multiplexed (WDM) channels that support multiple SONET channels. As shown in FIG. 1, an interoffice network typically is defined by a mesh topology. A pattern of interlocking SONET rings is superimposed on the underlying mesh topology so that data flows are constrained to follow the SONET rings. On the SONET ring, data flows in two directions, which enables a data flow to be quickly re-established if a failure occurs along the SONET ring.

Regardless of whether the interoffice network is a ring-based or a mesh-based topology, the interoffice network must have sufficient capacity to handle the data flows to and from the access network. Throughput of data through conventional interoffice network is usually limited by the capacity of the access networks. Access network capacity is required to be substantially increased and used more effectively in order to support the additional bandwidth requirements of integrated communication services including voice communications, data communications, audio/video-on-demand, and broadcast audio/video.

A conventional telephone network includes many subscriber nodes connected to a class 5 CO (end office) by one or more pairs of copper wires that are twisted together to reduce interference such as electromagnetic coupling to other wires. The maximum bandwidth of a signal that can be transmitted over twisted pair access lines is limited to approximately 1 MHz for typical distances between a telephone network subscriber and the corresponding telephone central office.

In some cases, the twisted pair access lines are terminated in a remote terminal in the telephone network subscribers' general geographical area, where signals on multiple subscriber lines are digitized, multiplexed onto a fiber, and sent to the CO. This latter type access is referred to as a digital loop carrier (DLC) system. COs for a common carrier wireline network support an average of approximately 12,000 subscriber access lines, which include twisted pair lines from subscriber nodes to the CO and from subscriber nodes to a DLC remote terminal. Large business enterprise customers may have fiber optic access lines running from the CO to the subscriber node as part of the SONET access ring.

III. Access Networks

In the past, bandwidth on most twisted pair access lines was limited to 4 KHz, which limits the equivalent data rate to approximately 64 Kb/s or less. Bandwidth was increased using the Integrated Services Digital Network (ISDN) basic rate interface (BRI) that supports a data rate of approximately 144 Kb/s over a twisted pair access line configured to support ISDN.

With the advent of digital subscriber line (DSL) techniques, bandwidth has been further expanded beyond the traditional 4 KHz limit and data rates in the megabit per second range can be supported over twisted pair access lines. Despite the enhanced capabilities provided by DSL, conventional access networks still limit network services as currently configured. The data rates that can be supported by DSL fall off rapidly as the length of the twisted pair lines between a CO and a subscriber node increases. Consequently, high DSL data rates are supported only for subscriber nodes that are relatively close to the CO.

The term digital subscriber line (DSL) refers to a set of techniques that enable high data rates to be transmitted over twisted pair access lines. Although there are a number of variations of DSL. Two types of DSL are relevant here, asymmetric DSL (ADSL) and very high speed DSL (VDSL).

A. ADSL Access Networks

ADSL involves relatively long twisted pair access lines running from the subscriber node to the CO with a relatively wide bandwidth assigned for downstream traffic (CO to subscriber node) and a relatively narrow bandwidth assigned for upstream traffic (subscriber node to CO).

FIG. 2 shows the downstream data rates that can be supported with ADSL as a function of the length of the twisted pair access line. These rates are for the case of 24-gauge wire and upstream rates about 10% of the downstream rates. As clearly shown by FIG. 2, the data rates supported by DSL decrease rapidly as the length of the access line increases.

A typical access line between the CO and the subscriber node, however, suffers from various degradations. For example, the use of narrower gauge wire, bridged taps, poor splices, and loading coils considerably reduces the data rates are achieved with ADSL. Typically, 26-gauge wire is utilized a distance up to 10,000 feet from the CO, with 24-gauge wire used for the remaining distance to the subscriber node. Bridged taps are defined as un-terminated line segments off the access line, which act as delay lines and induce nulls in the frequency response. Corrosion occurs at poor splices in the lines resulting in increased attenuation. The presence of loading coils preclude the use of DSL, which are placed on long access line to improve voice quality and attenuate frequencies above 4 KHz.

Over non-loaded twisted pairs up to 18,000 feet in length, ADSL can generally support data rates sufficient for high speed Internet access for users. However, ADSL generally does not support servers that require high upstream data rates.

Video compression techniques enable video-on-demand, with image quality comparable to the quality provided by VCRs, over ADSL lines that can support a downstream data rate of approximately 1.5 Mb/s. However, higher quality video requires rates in excess of 3 Mb/s and high definition television (HDTV) requires a data rate of approximately 20 Mb/s, even with a high degree of compression. Thus, high quality video cannot be supported over many ADSL access lines, and HDTV is not compatible with ADSL. Similarly, ADSL is not compatible with the audio/video broadcast capability provided by cable TV systems. Thus, ADSL falls short of being able to support a full range of communication services.

B. VDSL Access Networks

A second variation of DSL is a very-high-speed DSL (VDSL), which is similar to ADSL, except that VDSL involves relatively short access lines that run from the subscriber node to a remote terminal in the subscribers' general geographic area. VDSL supports higher data rates than ADSL. Typically, VDSL is asymmetric with downstream bandwidth and data rates higher than the upstream bandwidth and corresponding data rates. VDSL is capable of supporting higher data rates than other variations of DSL. VDSL twisted pair access lines from subscriber nodes are terminated in a remote terminal in the subscribers' general geographic area. This remote terminal is then connected to a CO by a fiber optic line. This approach greatly shortens the length of the twisted pair lines and enables VDSL to support high data rates as illustrated in FIG. 3.

For an access line length of 3,000 feet or less, VDSL can provide data rates greater than 20 Mb/s, which is sufficient to support an HDTV channel or several conventional TV channels. However, VDSL by itself can support only a very limited audio/video broadcast capability and cannot support a broadcast capability comparable to that provided by cable TV systems.

SUMMARY OF THE INVENTION

The embodiments described herein provide exemplary architectures and methods for providing communication services over twisted pair telephone lines including voice communications, data communications, audio/video-on-demand, and broadcast audio/video. Using the methods and architectures of this invention, an audio/video broadcast capability comparable to the capabilities of cable TV systems can be provided at a considerably lower cost than the costs associated with FTTH. Also, access networks based on these methods and architectures can be deployed more quickly than FTTH.

The exemplary architectures described herein are based on deploying fiber-to-the-neighborhood (FTTN) and employing high data rate digital subscriber line (DSL) techniques. An array of remote terminals would be constructed with each remote terminal connected by twisted pair access lines to a set of subscribers in the immediate vicinity. Existing twisted pair access lines could be used. In this way, the length of the twisted pair lines is kept short, generally less than half a mile, and high data rates could be supported over the twisted pair lines. The array of remote terminals would be connected to one or more telephone central offices (COs) by fiber optic cables so that each remote terminal could communicate with one or more COs.

Broadcast audio/video would be replicated in the central offices (COs) and sent to the remote terminals, where it would be switched onto subscriber lines. Using an upstream control channel, a subscriber could select audio/video channels from a much larger set of channels. With this approach, an audio/video broadcast capability comparable to the capability provided by cable TV systems would be provided over telephone lines.

In residential areas, downstream data rates sufficient to support voice communications, data communications, ISDN, high speed Internet access, audio/video-on-demand, and broadcast audio/video would be provided over twisted pair access lines using high rate DSL interfaces. In commercial areas, the downstream and upstream rates are tailored to the needs of business customers.

Redundancy could be provided in the access network to enable protection against access network failures. Each remote terminal could be directly or indirectly connected to two COs so that subscriber connections could be switched to a backup CO in case a transmission line failure or a failure at the primary CO disrupts service to the subscriber nodes. Subscribers requiring very high reliability could be connected to two remote terminals to provide comprehensive protection against access network failures.

BRIEF DESCRIPTION OF THE DRAWINGS

The features and inventive aspects of the present invention will become more apparent upon reading the following detailed description, claims, and drawings, of which the following is a brief description:

FIG. 2 presents a prior art table showing achievable ADSL data rates in relation to the length of a twisted pair access line.

FIG. 3 illustrates a prior art table showing achievable VDSL data rates in relation to the length of a twisted pair access line.

FIG. 9 presents a table showing three options for combining services offered to subscribers.

DETAILED DESCRIPTION

Figure 1:
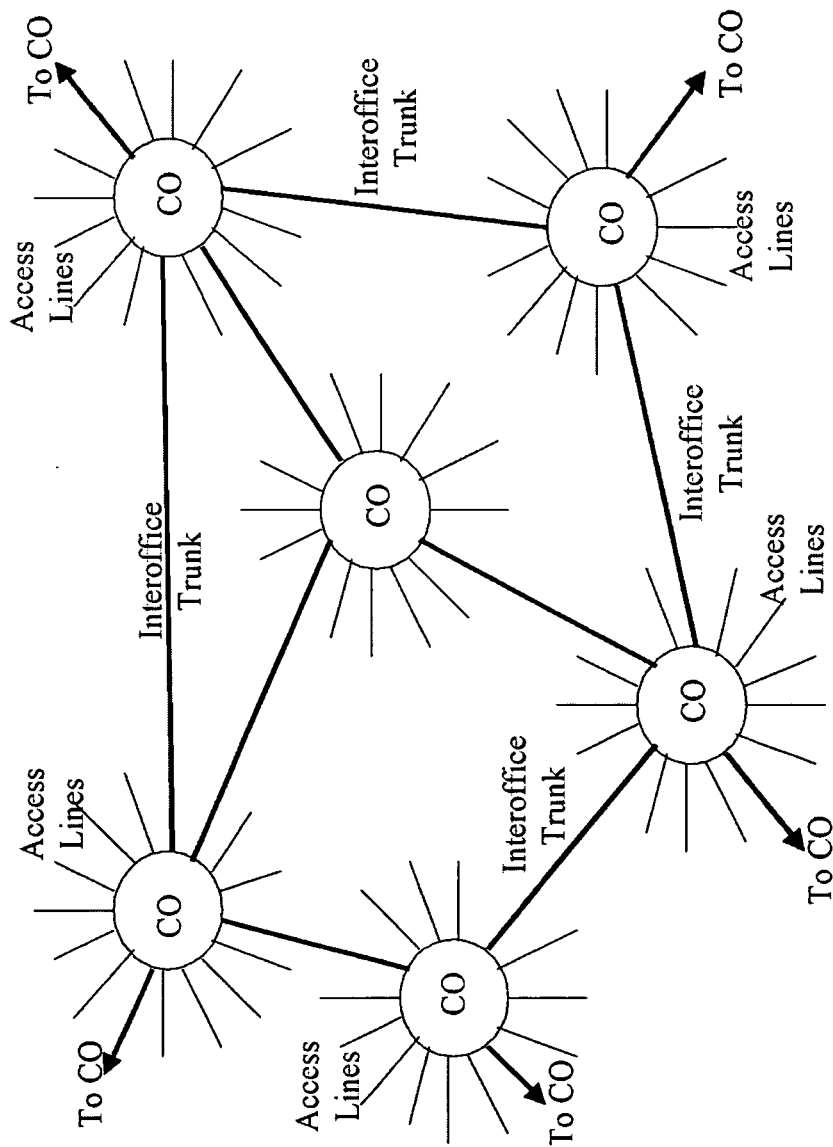
FIG. 1 illustrates a prior art small scale telephone network.

Referring now to the drawings, preferred illustrative embodiments of the present invention are presented. Although the drawings represent embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

I. Broadband Access Network

The applicant has recognized the limitations of prior art access networks and the capabilities and limitations of DSL technologies. The applicant proposes implementing a broadband access network based on fiber-to-the-neighborhood (FTTN) and high rate DSL interfaces on twisted pair access lines of the type used traditionally within a telephone network. This access network will be able to support a wide range of communication services, including voice communications, data communications, high speed Internet access, audio/video-on-demand, and broadcast audio/video.

An access network based on the methods and architectures of this invention would comprise: a geographically distributed array of remote terminals; fiber optic cables interconnecting the remote terminals within the array and connecting the array to one or more telephone central offices (COs); twisted pair telephone lines connecting each remote terminal to a set of subscriber nodes in its immediate vicinity. Each remote terminal in the array would communicate with one or more COs via the fiber optic cables. Each remote terminal would communicate with each of its attached subscriber over a high rate DSL interface.

A. Subscriber Interfaces

Figure 4:
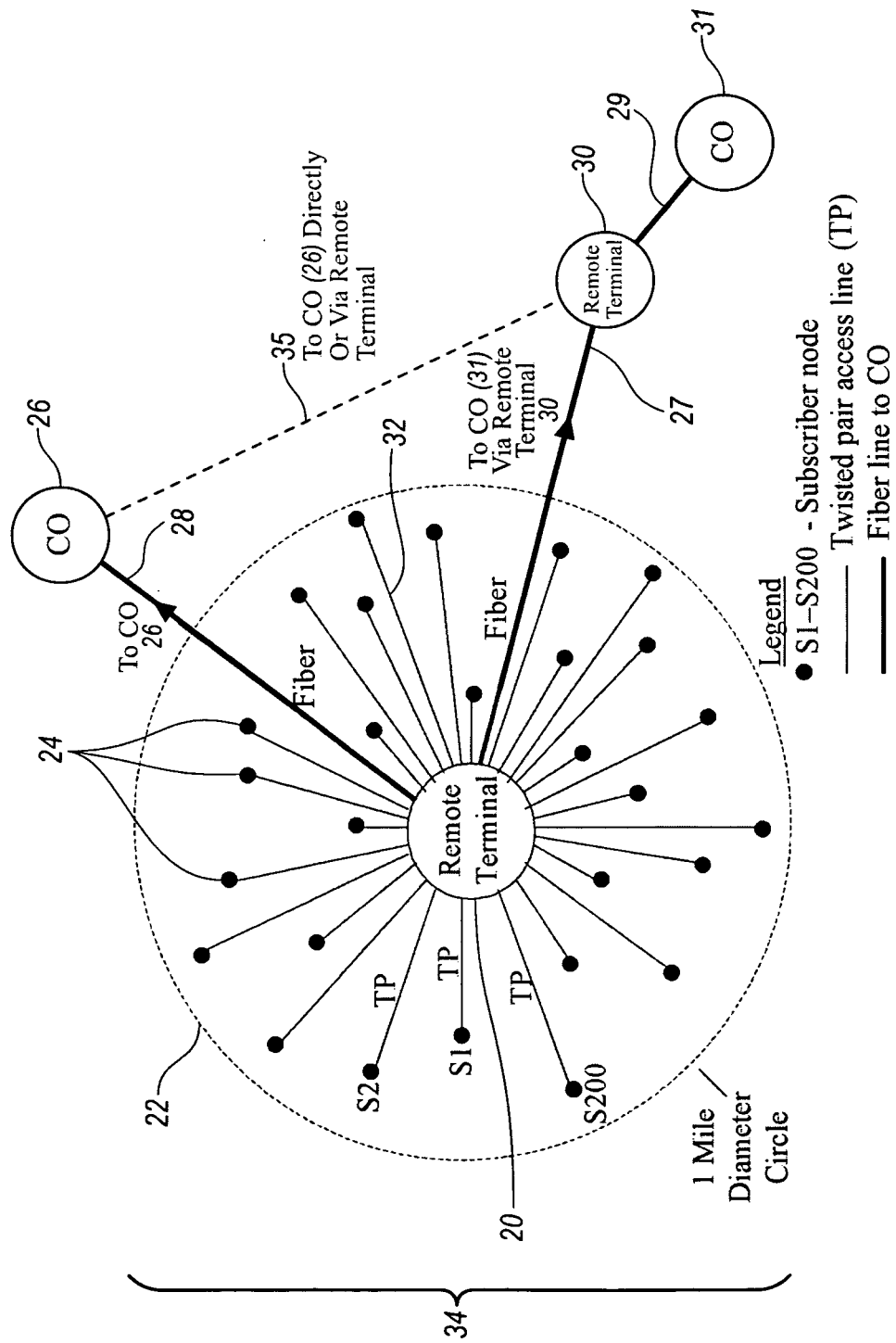
FIG. 4 illustrates the connections between a remote terminal and a set of subscribers and between the remote terminal and telephone central offices.

FIG. 4 illustrates connections between a remote terminal 20 and a set of subscriber nodes 32. The remote terminal is connected by twisted pair access lines to set of subscriber nodes in a hub and spoke configuration. In the embodiment shown by FIG. 4, subscriber nodes 32 within an area of one mile in diameter 22 are connected to the remote terminal. In sparsely populated areas, the service area of a remote terminal would remain approximately the same, however, the remote terminal would be connected to fewer subscriber nodes than the number (200) shown in FIG. 4. In densely populated areas, a remote terminal would connect to more subscriber nodes over a smaller area.

VDSL interfaces would be provided on the twisted pair access lines connecting a remote terminal to subscriber nodes. Downstream data rates of 26 Mb/s are proposed for these interfaces. The prior art table presented in FIG. 3 indicates that downstream data rates in excess of 30 Mb/s can be supported by a twisted pair access line when the length of this access line is generally half a mile or less. Thus, the proposed downstream rates are feasible for the configuration illustrated by FIG. 4.

Preferably, the connection between a subscriber node and remote terminal would employ existing twisted pair access lines, including existing distribution cables, from the remote terminal to the curb, and existing drop cables from the curb to the subscriber premise. The use of existing access lines greatly reduces the cost of deploying the access network.

In most cases, there would only a single connection 32 between a subscriber node 24 and a remote terminal. A failure of this connection would disable services for the subscriber. For subscribers requiring very high reliability, a second connection would be provided, preferably to a different remote terminal.

B. Remote Terminal to CO Connections and Communications

In the embodiment shown by FIG. 4, remote terminal 20 is directly connected by a high speed transmission media as illustrated in the embodiments herein as a fiber optic line 28 to CO 26. In many cases, the connection between the remote terminal 20 and the CO 26 will pass through one or more other remote terminals.

Communications between the remote terminal 20 and the CO 26 would be established over the fiber optic line 28 between the remote terminal 20 and the CO 26. These communications would include: downstream traffic destined for the subscriber nodes 24 attached to the remote terminal 20; upstream traffic from the attached subscriber nodes 24; and audio/video broadcast signals. Broadcast audio/video would be replicated in the central offices (COs) and sent to the remote terminals 20 connected to the CO 26. This would enable the CO 26 to support the broadcasting capability by receiving a single broadcast signal (containing multiple broadcast channels).

As shown by FIG. 4, redundant connections may be provided in the access network 34 to protect against failure. Remote terminal 20 is indirectly connected to a second CO 31 via another remote terminal 30. If the connection between the remote terminal 20 and CO 26 fails then remote terminal 20 would receive downstream data from the second CO 31 via the fiber optic lines 27 and 29. Remote terminal 20 would switch upstream data onto the fiber optic line 27 connected via remote terminal 30 and fiber optic line 29 to the second CO 31. Alternatively, a second connection from remote terminal 20 to the first CO 26 may be provided. This second connection could pass through remote terminal 30 and possibly through another remote terminal, as indicated by the dashed line 35 in FIG. 4.

Fiber optic cables 26, 27, and 29 in FIG. 4 would replace existing twisted pair feeder cables, which run from the CO to the subscriber neighborhoods. A typical feeder cable containing hundreds of twisted pairs could be replaced by a single fiber within a fiber optic cable. For a given number of subscribers, the number of required fiber optic cables would be small compared to the number of access lines supported and small compared to the number of fiber lines needed to deploy FTTH.

C. Access Network Topology

Figure 5:
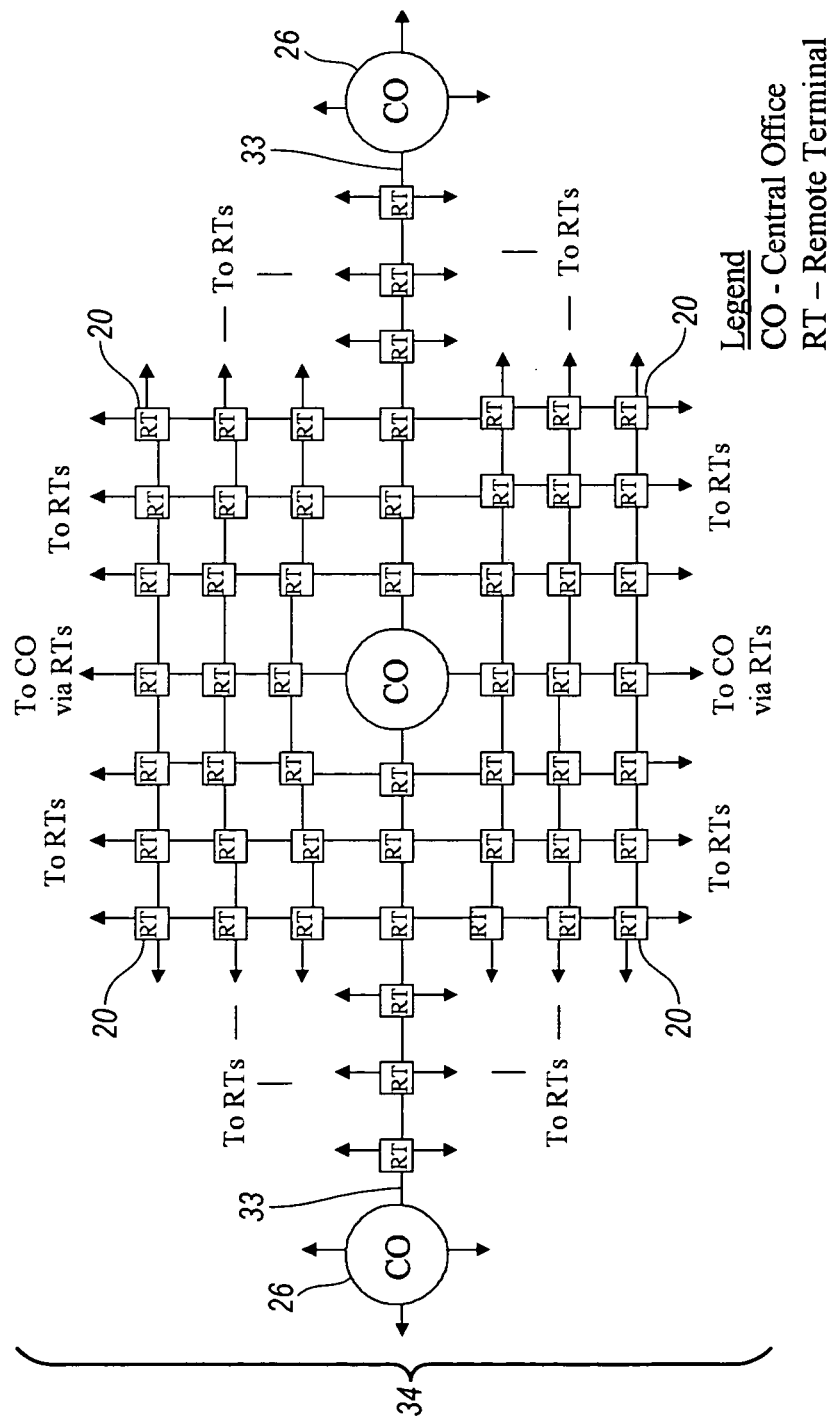
FIG. 5 illustrates an array of remote terminals connected to central offices.

The access network 34 as illustrated in FIG. 5 shows an array of remote terminals 20 interconnected by fiber optic cables 33 with the remote terminals unevenly distributed in two-dimensional space. The distribution of subscriber nodes 24 and remote terminals 20 generally follows a population distribution. The number of subscriber nodes 24 supported by the remote terminal 20 is larger in heavily populated geographical areas 22 than in lightly populated geographical areas 22. The distribution of remote terminals 20 is more uniform than a population distribution. The remote terminals 20 are distributed on a two-dimensional grid, which is not necessarily rectangular.

The remote terminals 20 and interconnecting fiber optic cables 33 in FIG. 5 are arranged in a mesh topology, which facilitates establishing connections and provides redundancy. Each remote terminal within the array would be connected by fiber optic cables 33 to two or more other remote terminals in the array. The array would be connected to one or more COs 26 by fiber optic cables, such that each CO would be directly connected to two or more remote terminals in the array. Each remote terminal in the array would be connected to one or more COs, either directly or through one or more remote terminals. The fiber optic cables 33 in FIG. 5 would be used to support communications between the remote terminals and the COs. For the case where a particular remote terminal is directly connected to a particular CO, communications between these elements would traverse the fiber optic cable directly connecting them. In other cases, communications between a remote terminal and a CO would pass through one or more other remote terminals and would traverse two or more fiber optic cables.

The fiber optic cables 33 interconnecting the remote terminals 20 and COs in FIG. 5 preferably would contain multiple fibers. During installation of the fiber optic line 28 at the remote terminal 20, one or more fibers (not shown) are dropped from a distribution cable (not shown) that is generally routed along a roadway and the remaining fibers are carried to other remote terminals 20 along the access network 34. Generally, a fiber may pass by multiple remote terminals 20 before being used. Fibers that interconnect COs may follow the same routes as the fibers connecting the COs to the remote terminals 20.

D. Remote Terminal Operation

During routine operation, the remote terminal 20 communicates with a set of subscriber nodes 24 via twisted pair lines 32 and with at least one CO 26 via fiber optic line 28 as shown in FIG. 4. As discussed above, if a relevant failure occurs on the fiber optic line 28 or at CO 26 itself, then signals from the subscriber nodes 24 connected to the remote terminal 20 are switched onto an alternate fiber optic line 27 connected to a second CO 31 directly or by way of an alternate remote terminal 20. Similarly, signals from CO 31 are utilized instead of signals from CO 26.

It is contemplated that the remote terminal 20 consists of signal processing elements, one or more fiber optic lines 28 and 29, and a plurality high rate DSL interfaces over twisted-pair lines 32. The remote terminal 20 provides the capability to receive signals on the fiber optic lines 28 from CO 26 and to resolve signal components. The remote terminal 20 extracts the data from the signal components and sends the data over the DSL interfaces such as at the outputs of VDSL interface units 78 to subscriber nodes 24. Signals are received on DSL interfaces from a plurality of subscribers, the data is extracted from these signals, multiplexed, aggregated, and sent over the fiber optic line 28 or 29 to COs 26 or 31. The remote terminal further provides the capability to send distinct signals to each attached subscriber node 24 and to receive audio/video broadcast signals containing a plurality of channels from one or more COs 26 for independent switching of one or more audio/video broadcast channels from a larger set of channels onto each DSL interface. The remote terminal 20 uses DSL interface data received from a particular subscriber node 24 to control the switching of broadcast channels onto the twisted-pair lines 32 connected to the particular subscriber node 24.

In one embodiment, wavelength division multiplexing (WDM) is employed to connect a plurality of remote terminals 20 to the CO 26 by at least one fiber. An example includes connecting up to eight (8) remote terminals 20 to CO 26 using a single fiber carrying nine (9) wavelength channels.

Figure 6:
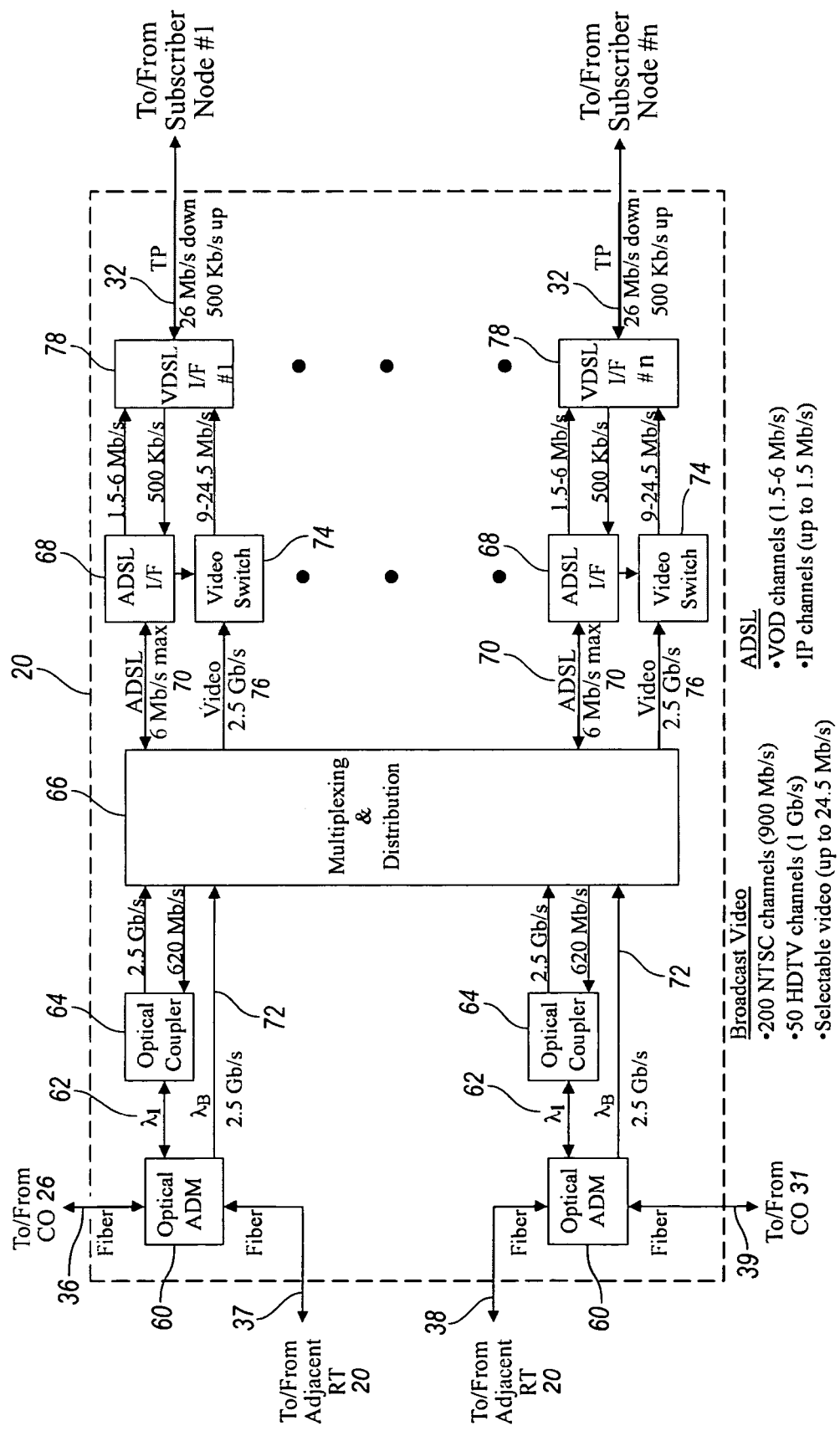
FIG. 6 illustrates a block diagram of a remote terminal with fiber optic and VDSL interfaces and having the capability to perform processing functions required for the access network.

In the embodiment of FIG. 6, a single fiber 36 is used to carry nine wavelength channels. Channels $\lambda_1$ (shown in FIG. 6) through $\lambda_8$ (not shown) are assigned to carry two-way signals between CO 26 and a set of eight remote terminals 20. One of these wavelength channels would be assigned to each remote terminal in the set. The final wavelength channel is a broadcast channel $\lambda_B$ and is assigned to carry broadcast signals between the primary CO 26 and the set of remote terminals 20. Unlike channels $\lambda_1$ through $\lambda_8$, the broadcast wavelength channel $\lambda_B$ is a one-way channel. The number of wavelength channels on the fiber 36 could be increased to support a larger set of remote terminals 20.

Another single fiber 39 with its multiple wavelength channels may be used to support communications between the remote terminal 20 of FIG. 6 and a second CO 31. This same fiber 39 could be used to support communications between CO 31 and other remote terminals.

Figure 7:
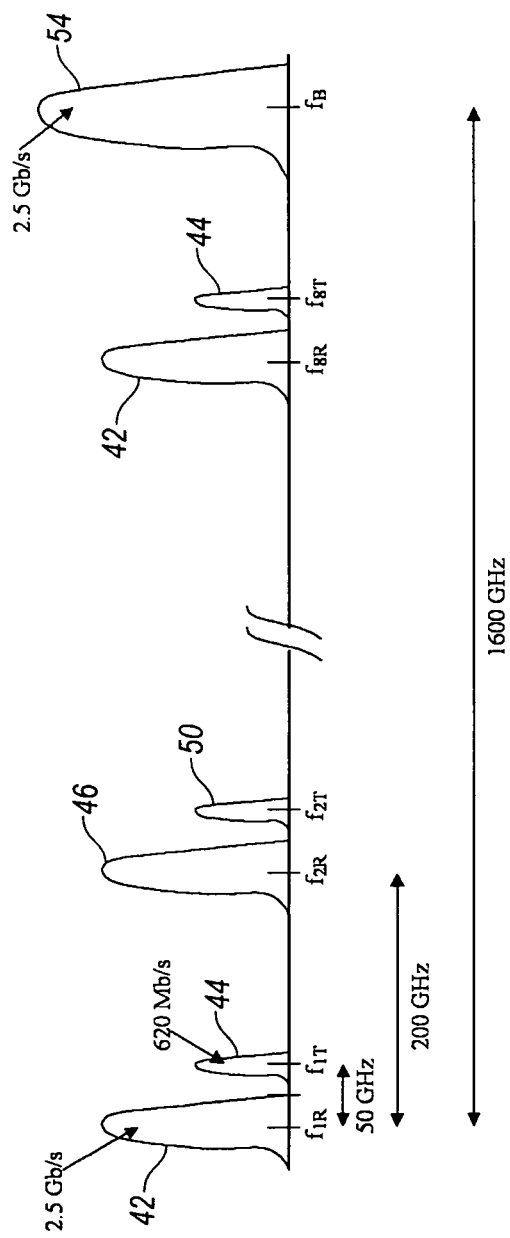
FIG. 7 illustrates a diagram showing a spectrum of a signal on a fiber line connecting a remote terminal to a central office.

FIG. 7 illustrates a spectrum of the signals on a single fiber 36 connecting the remote terminal 20 to its CO 26 in accordance with the embodiment described immediately above. In the illustrated embodiment there are 17 signal components, a transmit, and receive component for each of the 8 wavelength communication channels $\lambda_1$ through $\lambda_8$ assigned to a particular remote terminal 20 and a one-way broadcast component $\lambda_B$. A wavelength channel as shown in FIG. 7 is the channel for one remote terminal 20, where $(f_{1R})$ 42 and $(f_{1T})$ 44 are center frequencies of a receive signal and a transmit signal component for a wavelength channel $\lambda_1$, respectively. Similarly, $(f_{2R})$ 46 through $(f_{8R})$ 48 are the center frequencies of the receive signal for wavelength channel $\lambda_2$ through wavelength channel $\lambda_8$, respectively, and $(f_{1T})$ 50 through $(f_{8T})$ 52 are the center frequencies of the corresponding transmit signal for wavelength channels $\lambda_2$ through $\lambda_8$, respectively. The center frequency of receive-only broadcast channel is $(f_B)$ 54.

In the embodiment of FIG. 6 wavelength channel $\lambda_1$ contains a SONET framed receive signal at frequency $(f_{1R})$ 42 with a data rate of 2.5 Gb/s (OC-48) and a SONET framed transmit signal at frequency $(f_{1T})$ 44 with a data rate of 620 Mb/s (OC-12) as shown in FIG. 7. These data rates include SONET overhead. The SONET signals contain payloads with data for each of the attached subscriber nodes 24. A spacing of 50 GHz between $(f_{1R})$ 42 and $(f_{1T})$ 44 is enough to prevent any significant overlapping of a receive spectra and a transmit spectra. Similarly wavelength channels $\lambda_2$ through $\lambda_8$ contain SONET framed signals. Broadcast channel $(\lambda_B)$ contains a receive only signal with a data rate of 2.5 Gb/s. The center frequencies of the wavelength channels are separated by approximately 200 GHz. This separation is enough to prevent the spectrum of a channel from overlapping the spectrum of an adjacent channel.

FIG. 6 illustrates the operation of the remote terminal 20 communicating via a wavelength channel $\lambda_1$ 62. Inside an optical add/drop multiplexer (ADM) 60, the signal on the fiber 36 is demultiplexed and a receive component in the wavelength channel $\lambda_1$ 62 is dropped at the remote terminal 20. The receive components in channels $\lambda_2$ through $\lambda_8$ are passed through the ADM onto fiber 37 and sent to the other remote terminals in the set of eight. Similarly, a transmit component for a wavelength channel $\lambda_1$ 62 is multiplexed or added onto the fiber 36 by the optical ADM 60. The broadcast signal power is split in the optical ADM 60, with some of the signal power being dropped and some of the signal being passed through. The optical coupler 64 combines the transmit and receive signals on a common fiber connected to the optical ADM 60 with separate transmit and receive fibers connecting the optical coupler 64 to an electronic multiplexing and distribution unit 66. It is contemplated that the electronic multiplexing and distribution unit 66 may be a converter located anywhere on the access network 34.

The multiplexing and distribution unit 66 converts the received optical signals to electronic signals, demultiplexes the component signals in a wavelength communication channel ($\lambda_1$) 62, and sends the component signals to an ADSL interface unit 68. The ADSL interface unit 68 does not perform conventional ADSL functions, but instead performs functions in support of services similar to conventional ADSL services. Similarly, signals and data associated with the ADSL interface unit 68 are referred to as ADSL signals and ADSL data, respectively, even though they do not follow conventional usage of these terms. Component signals received from the ADSL interface unit 68 are multiplexed together in the multiplexing and distribution unit 66 and converted to an optical signal, which is sent to the optical coupler 64. Each ADSL signal 70 preferably has a maximum downstream data rate of 6 Mb/s and maximum upstream data rate of 500 Kb/s. The multiplexing and distribution unit 66 performs statistical multiplexing on the ADSL signal 70. Thus, the composite date rate is less than the product of the maximum data rate times the number of subscriber nodes 24. The total downstream and upstream data rates for 200 subscriber nodes 24 is easily accommodated by the wavelength channel ($\lambda_1$) 62, which provides rates of 2.5 Gb/s downstream and 620 Mb/s upstream.

The multiplexing and distribution unit 66 converts the receive-only broadcast signal in channel ($\lambda_B$) 72 and distributes this signal to each of the video switches 74, which operate in parallel to the ADSL interface units 68 although communication can take place from an ADSL interface unit to the corresponding video switch as shown in FIG. 6 and discussed in further detail below. One or more line drivers in the multiplexing and distribution unit would be employed to transmit the broadcast signal to multiple video switches.

As further discussed below, the broadcast channel 76 supports a plurality of audio/video channels if data compression is employed. The 2.5 Gb/s data rate can easily accommodate 250 video channels and many more audio channels.

ADSL services include high speed Internet access, streaming audio services, and streaming audio/video services, which are described in further detail below. These ADSL services are distinct from the broadcast service. An ADSL interface unit 68 processes ADSL service data and performs the handshaking with the subscriber nodes 24 associated with selection of services. In practice, the data rates for ADSL services are typically 1.5 to 6 Mb/s downstream and up to 500 Kb/s upstream. There is a separate ADSL interface unit 68 for each subscriber node 24. The ADSL interface unit 68 also handles plain-old-telephone service (POTS) and basic rate Integrated Services Digital Networks (ISDN) service. Data associated with these latter services is passed through the ADSL interface unit 68 without alteration or significant delay, and data rates listed above do not include POTS/ISDN data.

The remote terminal 20 includes a separate video switching element 74 for each attached subscriber node 24. It is contemplated that the video switching element 74 includes support for audio streams associated with the video streams and for audio streams by themselves. The video switching element 74 enables a subset of broadcast channels to be transmitted to a particular subscriber node 24. FIG. 6 shows the video switching element 74 selecting a set of broadcast video channels having a composite data rate in the range of 9 to 24.5 Mb/s form a larger set of broadcast channels having a composite data rate of 2.5 Gb/s. A control signal or instruction in the upstream data from the subscriber node 24 is used by the remote terminal to select the desired audio/video channels.

Implementing a high rate DSL interface includes setting up the twisted pair access line 32 from the subscriber node 24 that is terminated in the remote terminal 20. The preferred embodiment for this interface would follow VDSL standards. However, comparable high rate interfaces could be employed instead. In the embodiment of FIG. 6, a VDSL interface unit 78 receives digital data from its corresponding ADSL interface unit 68 and its corresponding video switching element 74 and sends this data over a twisted pair line 32 to the subscriber node 24. It is contemplated that the ADSL interface unit 68 is ADSL-like and may not include all standard interfaces and protocols of standard ADSL. The high rate DSL interface, the VDSL interface unit 78, and the ADSL interface unit 68 each provide the capability of sending and receiving distinct signals to and from each subscriber node 24 respectively. Preferably, the VDSL interface unit is directly connected to the twisted pair line 32. Each remote terminal 20 communicates with its attached subscriber nodes 24 over the high rate DSL interface or the VDSL interface unit 78. The ADSL interface unit 68 and the VDSL interface unit 78 are shown to be located in series. A high rate DSL interface unit (not shown) is contemplated that supports data rates at least equal to the VDSL interface unit 78. The VDSL interface unit 78 receives upstream data from the subscriber node 24 and sends the data to the ADSL interface unit 68. Thus, there is two-way communication between the two DSL interface units. ADSL downstream data and broadcast data are used by the VDSL interface unit 78 to modulate the signal that is transmitted over the twisted pair line 32. The VDSL interface unit 78 demodulates the signal received over the twisted pair line 32 to extract upstream ADSL data. The POTS and the ISDN data is passed through the ADSL interface unit 68 without alteration, except for modulation and demodulation. A high rate DSL is contemplated that includes both the ADSL interface unit 68 and the VDSL interface unit 78.

Figure 8:
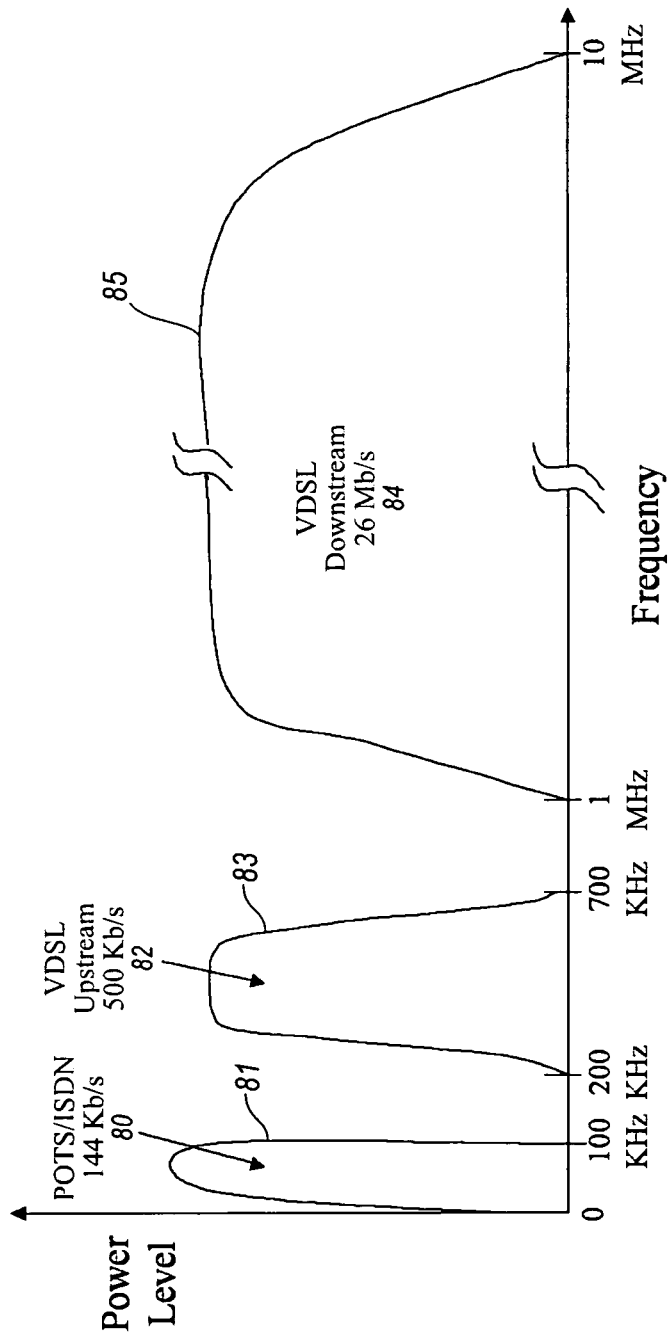
FIG. 8 illustrates a diagram showing a spectrum of a signal on a twisted pair line connecting a remote terminal to a subscriber.

The VDSL spectrum is specified over the range of 200 KHz to 30 MHz. The full VDSL spectral range is typically not employed. FIG. 8 illustrates the VDSL spectrum of the signals employed on the twisted pair line 32 of FIG. 6 connecting the remote terminal 20 to the subscriber node 24. A first frequency band 81 up to approximately 100 KHz is used for POTS, which has an equivalent data rate of 64 Kb/s, and basic rate ISDN, which has an ISDN data rate 80 of 144 Kb/s. A second frequency band 83 from approximately 200 KHz to approximately 500 KHz is used for the VDSL upstream data, which has a maximum VDSL data rate 82 of approximately 500 Kb/s. A third frequency band 85 from approximately 1 MHz to approximately 10 MHz is used for both the VDSL downstream data and the broadcast data, which has a combined maximum VDSL data rate 84 of 26 Mb/s. If a failure occurs and the remote terminal 20 switches over to the secondary CO 31 as illustrated in FIG. 4, then the data rates of the affected subscriber node 24 will be reduced.

The VDSL option described above has the downstream bandwidth and a downstream VDSL data rate 84 greater than the upstream bandwidth and upstream VDSL data rate 82. Other VDSL options are contemplated. If the upstream bandwidth is increased, the upstream VDSL data rate 82 is increased by a roughly proportional amount. One option contemplated is a symmetric VDSL implementation, where the upstream VDSL data rate 82 and the downstream VDSL data rate 84 are both approximately 13 Mb/s and the upstream and downstream bandwidths are approximately equal. To minimize crosstalk from a downstream channel on one twisted pair line 32 to the upstream channel on another twisted pair line 32 in the same cable, the upstream and downstream bands should not overlap. Thus, the asymmetric and symmetric versions of VDSL should not be used within the same cable.

E. Compatibility of FTTN Network with the Interoffice Network

Using the methods and architectures described herein, access networks that are compatible with existing interoffice networks can be constructed. Existing interoffice networks have sufficient capacity to support the data flows through the proposed access network 34 as illustrated in FIG. 5, specifically the data flows associated with support broadcast and individual services for the subscriber nodes 24.

As further discussed above, a composite broadcast signal has a data rate of 2.5 Gb/s. The composite broadcast signal is preferably replicated throughout the interoffice network and in the remote terminals 20. Thus, only a single copy of the composite broadcast signal needs to be transmitted on any access network 34 link.

In an interoffice network as disclosed, the average number of subscriber nodes 24 served by the CO 26 is approximately 12,000. If this many subscriber nodes 24 are operating continuously at a full maximum individual downstream data rate of 6 Mb/s, then the aggregate downstream data rate that is supported by the CO 26 may be approximately 75 Gb/s, which includes broadcast data. However, the actual data rate would is less than this theoretical maximum. Not all subscriber nodes 24 are active at the same time, and most subscriber nodes 24 are receiving data at less than the maximum rate. Since statistical multiplexing and demultiplexing is performed in the remote terminals 20, the aggregate data rate at a particular time of day will be close to average data rate for that time of day times the number of active subscriber nodes 24. If 10,000 active subscriber nodes operating at an average downstream data rate of 1 Mb/s excluding broadcast data, then the aggregate downstream data rate that must be supported by the CO 26 is approximately 12.5 Gb/s, which includes 2.5 Gb/s for broadcast data and 10 Gb/s for individual downstream data. The upstream data rate that must be supported by the CO 26 is typically lower than this downstream data rate. With current transport technology, interoffice networks can readily provide the capacity required to support the proposed broadband access networks.

II. Network Services Supported

Services supported by the access network 34 as illustrated in FIG. 4 and FIG. 5 include: POTS, basic rate ISDN, high speed Internet access, audio/video-on-demand, broadcast audio and video, and various Internet Protocol (IP) services, such as high speed Internet access and voice over IP. POTS, ISDN, and Internet access are similar services currently provided over telephone interfaces using analog, digital, and ADSL interfaces, respectively Video services are the most demanding services in terms of the required capacity of the twisted pair lines 32 as illustrated in FIG. 4 and FIG. 6, and these services require special processing as illustrated by FIG. 6. The access network 34 provides the capability to send audio/video broadcast signals containing a plurality of channels from the COs 26 to the remote terminals 20. The remote terminals 20 provide the capability to switch one or more audio/video broadcast channels for each subscriber onto the subscriber's access line. Each subscriber is provided the capability to select via the DSL interface one or more audio/video broadcast channels from a larger set of broadcast channels.

Audio and video data is generated in continuous streams rather than discrete blocks. For directly encoded digital audio/video, the data rates are fixed, but can be very high. Audio/video compression techniques such as the Moving Pictures Experts Group (MPEG) techniques significantly reduce data rates. For example, with MPEG-2 compression, National Standard Television Committee (NTSC) video rates are reduced from 216 Mb/s to between 3 and 6 Mb/s. Directly encoded High Definition TV (HDTV) video, which has approximately 5 times as many pixels as NTSC video, requires a data rate of approximately 1 Gb/s. However with MPEG-2 compression, the required HDTV data rate is reduced to approximately 20 Mb/s. Streaming audio is typically encoded using MPEG Layer 3 (MP3) and is accommodated with a data rate of 128 Kb/s. Consequently, MPEG compression enables many broadcast channels to be accommodated within the 2.5 Gb/s capacity of the broadcast channel, whose spectrum 54 is shown in FIG. 7 As indicated on the process diagram in FIG. 6, the broadcast channel accommodates 200 NTSC, 50 HDTV, and many audio channels.

MPEG data rates vary from frame to frame and from scene to scene, with scenes containing a lot of motion requiring relatively high data rates. Buffering of frames is employed to significantly reduce variations in the transmission data rate due to frame-to-frame variations. A transmission rate variation due to scene-to-scene variations is reduced by statistical multiplexing of multiple video channels. MPEG-2 data is separated into base layer data and enhancement layer data. The base layer is required for proper video operation. The enhancement layer provides enhanced image quality, but is not required for proper video operation The VDSL channel capacity must be sufficient to accommodate the composite base layers of all the video channels transmitted over the VDSL channel. However, the channel capacity does not necessarily need to accommodate the maximum composite data rate of both the base layers and enhancement layers. Instead, if this composite data rate exceeds the channel capacity, the enhancement data for one or more video channels can be dropped and the associated images would suffer some temporary graceful degradation.

Many combinations of services can be supported over VDSL access lines. Three options for combining the VDSL services are illustrated in FIG. 9. POTS/ISDN services may be supported and are contemplated for each option shown in FIG. 9.

Referring to FIG. 9, a first example includes service option 1 that contemplates that the broadcast data rate is 24.5 Mb/s and the downstream ADSL data rate is 1.5 Mb/s. Service option 1 supports one HDTV broadcast channel at 20 Mb/s and one NTSC audio/video broadcast channel at 4.5 Mb/s with MPEG-2 compression. Multiple MP3 audio broadcast channels may be substituted for the NTSC video channel. Service option 1 also supports one MPEG-1 video-on-demand (VOD) channel at 1.5 Mb/s. High speed Internet access for a plurality of IP service components and multiple MP3 audio-on-demand channels may be substituted for this video-on-demand channel.

A second example includes service option 2 that contemplates that the broadcast data rate is 20 Mb/s and the downstream ADSL data rate 6 Mb/s. Service option supports one HDTV broadcast channel at 20 Mb/s and two MPEG-2 video-on-demand channels at 3 Mb/s each. Multiple NTSC broadcast channels may be substituted for the HDTV channel. High speed Internet access for multiple IP components and multiple MP3 audio-on-demand channels may be substituted for a video-on-demand channel.

A third example includes service option 3 that contemplates that the broadcast data rate is 13 Mb/s and the downstream ADSL data rate 13 Mb/s. Service option 3 supports three NTSC video broadcast channels at 4.5 Mb/s each and three MPEG-2 video-on-demand channels at 4.5 Mb/s each. High speed Internet access for multiple IP components and multiple MP3 audio-on-demand channels may be substituted for a video-on-demand channel.

The data rates listed above are nominal rates; the actual rates generally vary. To ensure proper operation, the sum of the maximum rates for the MPEG-2 base layers of the selected channels (including broadcast and on-demand video) should be less than the allocated capacity. For example, the sum of the rates for the HDTV base layer data and the NTSC base layer data are less than 24.5 Mb/s in service option 1 illustrated in FIG. 9. Excess capacity can be utilized by the enhancement layers. The excess capacity may be less than the sum of the maximum rates of the enhancement layer. In the case of service option 1, if the maximum enhancement layer rates for the HDTV and NTSC video channels occur at the same time, then the enhancement layer data for one of the channels may need to be dropped. As the number of video channels increases, statistical multiplexing provides a greater advantage, and the probability of exceeding the excess capacity, and suffering image degradation, decreases. Flow control is used on the Internet access channels to free up more capacity for the video channels when needed. If the remote terminal 20 switches over to the secondary CO 31 as shown in FIG. 4, then the services for each of the options illustrated in FIG. 9 would be scaled back.

The service options described above are suitable for the residential subscriber nodes 24 as shown in FIG. 4. These service options may not be suitable for business customers. In commercial areas, the symmetric VDSL option described above is more appropriate. With the symmetric VDSL option, data rates of 13 Mb/s are provided for both the upstream and downstream traffic, and the broadcast feature, which is used primarily for entertainment, is not supported. This 13 Mb/s data rate could support voice including POTS voice and voice over IP, data transfers from servers, virtual private networks, Internet access, and video teleconferencing. Typically, a particular remote terminal 20 supports either the services associated with asymmetric VDSL or the services associated with symmetric VDSL, but not both.

III. Alternative Embodiments

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the embodiments should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A method for providing communication services comprising the steps of:
    constructing a geographically distributed array of remote terminals;
    interconnecting said array using a plurality of fiber optic lines;
    having a remote terminal proximate a plurality of subscriber nodes;
    interconnecting said remote terminal to said array of remote terminals;
    connecting said array of remote terminals to at least one central office by a fiber optic line;
    establishing communications between said remote terminal and said central office by said fiber optic line;
    connecting said remote terminal to each one of said subscriber nodes by a twisted pair line;
    employing a DSL interface in communication with an attached subscriber node by said twisted pair line, said DSL interface being remote from said subscriber node and said DSL interface including an ADSL interface and a VDSL interface at said remote terminal;
    employing a video switch in parallel communication with said ADSL interface and in series communication with said VDSL interface, said video switch being remote from said subscriber node;
    transmitting a first distinct signal to said attached subscriber node and receiving a second distinct signal from said attached subscriber node;
    sending an audio/video broadcast signal having a plurality of audio/video channels from said central office to said remote terminal and to other remote terminals in said array;
    providing switching of a subset of said audio/video channels onto a subscriber interface; and
    providing selection of said subset of said audio/video channels by said DSL interface at said remote terminal using data received from said attached subscriber node.

2. The method of claim 1, including a step of providing redundant communication between said remote terminal and at least one second central office by providing a second fiber optic line between said remote terminal and said second central office.

3. The method of claim 2, wherein said providing redundant communication includes said fiber optic line having at least one fiber optic cable with a plurality of optical fibers, such that said fiber optic line directly connects said remote terminal to a specific central office or passes through at least one more remote terminal.

4. The method of claim 3, wherein said providing redundant communication includes a step of setting up a first connection between said remote terminal and a second remote terminal and setting up a second connection between said second remote terminal and said second central office.

5. The method of claim 1, wherein said providing switching includes a step of providing selection and switching of at least one video broadcast channel and its associated audio broadcast channel.

6. The method of claim 1, wherein said employing of said DSL interface includes not overlapping an upstream band with a downstream band.

7. The method of claim 1, wherein said employing of said DSL interface includes employing VDSL techniques and performing VDSL functions within said remote terminal.

8. The method of claim 7, including a step of connecting a processing element performing said VDSL functions to said twisted pair connection.

9. The method of claim 1, wherein said connecting said remote terminal includes disposing a converter between said fiber optic line and said DSL interface to translate between optical and electrical signals.

10. The method of claim 1, comprising the further step of sending instructions from said attached subscriber node to said remote terminal using a VDSL interface remote from said subscriber node, said instructions to be used to control said switching of said audio/video channels onto said VDSL interface.

11. The method of claim 1, including the step of providing compatibility with an interoffice network.

12. The method of claim 1, wherein said step of sending said audio/video broadcast signal includes a step of providing a downstream data rate sufficient for accommodating one MPEG compressed HDTV broadcast channel and for accommodating video on demand.

13. The method of claim 1, wherein said connecting said remote terminal includes using existing twisted pair lines.

14. The method of claim 1, including a step of employing wavelength division multiplexing on said fiber optic lines enabling said central office to communicate with a plurality of remote terminals using a single fiber.

15. The method of claim 1, including a step of interconnecting said array of remote terminals by a mesh topology, such that said remote terminal in said array of remote terminals is connected to at least two other remote terminals within said array of remote terminals and the capability is provided to establish communications between said remote terminal and said central office along a plurality of paths through said array of remote terminals.

16. A system for forming an access communication network comprising:
a geographically distributed array of remote terminals;
a plurality of fiber optic lines interconnecting said array of remote terminals;
at least one fiber optic line connecting said array of remote terminals to at least one central office;
a plurality of twisted pair line connecting a remote terminal to a plurality of subscriber nodes, said remote terminal being remote relative to said plurality of subscriber nodes and said at least one central office;
said access network providing communication services including voice communications, data communications, and broadcast audio/video services, said access network having a capability of sending a first signal to a particular subscriber node and receiving a second signal from said subscriber node; said access network providing the capability of sending an audio/video broadcast signal having a plurality of audio/video broadcast channels from said central office to a plurality of remote terminals in said array of remote terminals; and
wherein said remote terminal communicates with said central office by said fiber optic line, and said remote terminal communicates with an attached subscriber node by a DSL interface remote from said subscriber node and has the capability of switching a subset of said broadcast channels onto a subscriber interface from a larger set of said broadcast channels, said DSL interface including an ADSL interface and a VDSL interface at said remote terminal, and said remote terminal having a video switch in parallel communication with said ADSL interface and in series communication with said VDSL interface, said video switch being remote from said subscriber node.

17. The system of claim 16, wherein said remote terminal includes a second fiber optic line connecting said remote terminal and a second central office.

18. The system of claim 16, wherein said fiber optic line includes at least one fiber optic cable having a plurality of optical fibers, such that said fiber optic line directly connects said remote terminal to said central office or passes through at least one more said remote terminal.

19. The system of claim 16, wherein said access network includes a plurality of elements performing wavelength division multiplexing and demultiplexing functions to enable said plurality of remote terminals to communicate with said central office by a single fiber.

20. The system of claim 16, wherein said DSL interface includes employing VDSL techniques and performing VDSL functions within said remote terminal.

21. The system of claim 16, wherein said remote terminal receives said second signal by said subscriber node and employs said second signal to control switching of broadcast signals onto a VDSL interface of said subscriber node.

22. The system of claim 16, wherein said remote terminal includes a converter disposed between said fiber optic line and said DSL interface for translating between optical and electrical signals.

23. The system of claim 16, wherein said access network provides a downstream data rate sufficient to accommodate one MPEG compressed HDTV broadcast channel and sufficient to accommodate video-on-demand for said plurality of said subscriber nodes.

24. A remote terminal for a communication network comprising:
at least one signal processing element;
at least one fiber optic interface, said fiber optic interface receiving a first signal from a central office, said remote terminal further processing a first signal component of said first signal by extracting a first data element from said first signal component and sending said first data element over a DSL interface to a subscriber node, said DSL interface and said at least one fiber optic interface being remote from said subscriber node and communicating with said subscriber node by a twisted pair line;
a plurality of DSL interfaces each having an ADSL interface and a VDSL interface at said remote terminal and each selectively receiving a second signal from a corresponding said subscriber node, extracting a second data element from said second signal, processing said second data element and sending aggregated data over said fiber optic interface to said central office;
a video switch in parallel communication with said ADSL interface and in series communication with said VDSL interface, said video switch being remote from said subscriber node; and
wherein said remote terminal receives an audio/video broadcast signal having a plurality of broadcast channels from said central office and providing switching of a subset of said broadcast channels onto said DSL interface, said remote terminal receiving said second data element from said subscriber node for controlling said switching of said subset of said broadcast channels over said twisted pair line;
wherein said remote terminal extracts a first wavelength division multiplexed signal from a plurality of wavelength multiplexed signals on said fiber optic interface and inserts a second wavelength division multiplexed signal onto said fiber optic interface.

25. The remote terminal of claim 24, wherein an optical multiplexing/demultiplexing element is disposed between a two-way communication interface and said DSL interface.

26. The remote terminal of claim 24, wherein an optical coupler is disposed between said optical multiplexing/demultiplexing element and said DSL interface.

27. The remote terminal of claim 24, wherein a converter is disposed between said optical coupler and said DSL interface, said converter converts between optical signals and electrical signals.

28. The remote terminal of claim 24, wherein said DSL interfaces include two-way VDSL interfaces.

29. The remote terminal of claim 28, wherein said remote terminal transmits over said VDSL interfaces a downstream data flow directed to said subscriber node and transmits broadcast channels selected by said subscriber node.

30. The remote terminal of claim 24, wherein said remote terminal extracts a data signal received from a VDSL interface and uses said data signal to control switching of broadcast channels onto said VDSL interface.

* * * * *